United States Patent
Kuranoshita

(10) Patent No.: US 9,639,991 B2
(45) Date of Patent: May 2, 2017

(54) AUGMENTED REALITY PROVISION SYSTEM

(71) Applicant: FUJIFILM Corporation, Tokyo (JP)

(72) Inventor: Masashi Kuranoshita, Tokyo (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 46 days.

(21) Appl. No.: 14/624,866

(22) Filed: Feb. 18, 2015

(65) Prior Publication Data

US 2015/0262427 A1   Sep. 17, 2015

(30) Foreign Application Priority Data

Mar. 17, 2014  (JP) .................................. 2014-053543

(51) Int. Cl.
*G06T 19/00*       (2011.01)
*G06T 7/40*        (2006.01)

(52) U.S. Cl.
CPC ............ *G06T 19/006* (2013.01); *G06T 7/408* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2005/0285878 A1* | 12/2005 | Singh | H04M 1/72544 345/633 |
| 2007/0058223 A1* | 3/2007 | Matsuura | H04N 1/6033 358/518 |
| 2011/0063295 A1* | 3/2011 | Kuo | G06T 15/50 345/426 |
| 2014/0139552 A1 | 5/2014 | Morinaga et al. | |

FOREIGN PATENT DOCUMENTS

| | | |
|---|---|---|
| JP | 2003264740 A | 9/2003 |
| JP | 2010-170316 A | 8/2010 |
| JP | 2013-025329 A | 2/2013 |

OTHER PUBLICATIONS

Communication dated Jan. 19, 2016, from the Japanese Patent Office in counterpart application No. 2014-053543.

* cited by examiner

*Primary Examiner* — Haixia Du
*Assistant Examiner* — Nicholas R Wilson
(74) *Attorney, Agent, or Firm* — Sughrue Mion, PLLC

(57) ABSTRACT

Provided are an augmented reality provision system, a method, and a non-transitory computer readable medium capable of displaying a virtual object in a very natural representation form regardless of a state of an illumination in a real space. A plurality of same color patches with the same color are extracted from a captured image including a target. Light distribution characteristics of light with which the target is irradiated are estimated from a relationship between color values in the plurality of same color patches. An object image to which a visual effect in which the virtual object is irradiated with the light has been given depending on the estimated light distribution characteristics is obtained by correcting a color of an original object image indicating the virtual object.

12 Claims, 11 Drawing Sheets

AUGMENTED REALITY PROVISION SYSTEM

CROSS-REFERENCE TO RELATED APPLICATIONS

The present application claims priority under 35 U.S.C. §119 to Japanese Patent Application No. 2014-053543, filed on Mar. 17, 2014, all of which are hereby expressly incorporated by reference into the present application.

BACKGROUND OF THE INVENTION

1. Field of the Invention

The present invention relates to an augmented reality provision system including an imaging unit that images a real space, and a display unit that superimposes an object image indicating a virtual object on a captured image obtained through imaging in the imaging unit to display the object image, a method, and a non-transitory computer readable medium.

2. Description of the Related Art

An augmented reality provision system capable of performing AR (Augmented Reality) display in which a virtual object is superimposed on an image of a real space and displayed has been recently developed. For example, various image processing methods in which appropriate color adjustment is performed on an object image so as to increase senses of reality and presence of a virtual object have been proposed.

A method of calculating a transformation parameter from color of a pattern drawn in a marker expressing AR display and correcting the color of an object image based on the transformation parameter has been proposed in JP2010-170316A. A method of extracting an amount of a feature regarding a color tone of an entire image indicating a real space and correcting a color of an object image based on the amount of a feature has been proposed in JP2013-025329A.

Incidentally, when a non-transparent object is irradiated with light, light and shade, and a shadow dependent on a relative position and posture between an object and a light source (in this specification, collectively referred to as a "shading effect") occur. That is, an observer recognizes presence of this shading effect as "a normal appearance."

However, according to the methods proposed in JP2010-170316A and JP2013-025329A, only color balance of an entire object image is considered, and the above-described shading effect is not considered at all. As a result, a user may feel uncomfortable with an appearance of the virtual object according to a state of an illumination within the real space.

SUMMARY OF THE INVENTION

The present invention has been made to solve the aforementioned problem, and an object of the present invention is to provide an augmented reality provision system, a method, and a non-transitory computer readable medium in which a virtual object can be displayed in a very natural representation form regardless of a state of an illumination within a real space.

According to an aspect of the present invention, there is provided an augmented reality provision system including an imaging unit that images a real space, and a display unit that superimposes an object image indicating a virtual object on a captured image obtained through the imaging in the imaging unit and displays the object image, the system including: a feature part extraction unit that extracts a plurality of feature parts from the captured image including a target, the target including the plurality of feature parts having the same color; a light distribution characteristics estimation unit that estimates light distribution characteristics of light with which the target is irradiated, from a relationship between color values in the plurality of feature parts extracted by the feature part extraction unit; and an image correction unit that obtains the object image to which a visual effect in which the virtual object is irradiated with the light has been given depending on the light distribution characteristics estimated by the light distribution characteristics estimation unit, by correcting a color of an original object image indicating the virtual object.

Thus, since the light distribution characteristics estimation unit that estimates light distribution characteristics of light with which the target is irradiated, from a relationship between color values in the plurality of extracted feature parts, and the image correction unit that obtains the object image to which a visual effect in which the virtual object is irradiated with the light has been given depending on the estimated light distribution characteristics are provided, the same visual effect as a shading effect actually occurring in an actually existing target can be given to the virtual object. As a result, it is possible to display the virtual object in a very natural representation form regardless of a state of an illumination in the real space.

Further, preferably, the system further includes a feature amount acquisition unit that acquires a feature amount that specifies a position and/or a shape of the plurality of feature parts, and the feature part extraction unit extracts the plurality of feature parts using the feature amount acquired by the feature amount acquisition unit.

Further, preferably, the system further includes an arrangement determination unit that determines a position of the vicinity of the target, including a position of the target in the captured image, as an arrangement position of the object image obtained by the image correction unit.

Further, preferably, the target is a color chart including two or more color patches, the feature part is a plurality of same color patches included in the two or more color patches, and the feature part extraction unit extracts the plurality of same color patches from the captured image including the target.

Further, preferably, the image correction unit corrects the color of the original object image using color patches other than the plurality of same color patches among the two or more color patches.

According to another aspect of the present invention, there is provided an augmented reality provision method using a system including an imaging unit that images a real space, and a display unit that superimposes an object image indicating a virtual object on a captured image obtained through the imaging in the imaging unit and displays the object image, the method including: an extraction step of extracting a plurality of feature parts from the captured image including a target, the target including the plurality of feature parts having the same color; an estimation step of estimating light distribution characteristics of light with which the target is irradiated, from a relationship between color values in the plurality of extracted feature parts; and a correction step of obtaining the object image to which a visual effect in which the virtual object is irradiated with the light has been given depending on the estimated light distribution characteristics, by correcting a color of an original object image indicating the virtual object.

According to still another aspect of the present invention, an augmented reality provision program recorded on a non-transitory computer readable medium causes an augmented reality provision system including an imaging unit that images a real space, and a display unit that superimposes an object image indicating a virtual object on a captured image obtained through the imaging in the imaging unit and displays the object image, to execute: an extraction step of extracting a plurality of feature parts from the captured image including a target, the target including the plurality of feature parts having the same color; an estimation step of estimating light distribution characteristics of light with which the target is irradiated, from a relationship between color values in the plurality of extracted feature parts; and a correction step of obtaining the object image to which a visual effect in which the virtual object is irradiated with the light has been given depending on the estimated light distribution characteristics, by correcting a color of an original object image indicating the virtual object.

With the augmented reality provision system, the method and the non-transitory computer readable medium according to the present invention, since the light distribution characteristics of light with which the target is irradiated is estimated from the relationship between the color values in the plurality of extracted feature parts, and the object image to which the visual effect in which the virtual object is irradiated with the light has been given depending on the light distribution characteristics is obtained, the same visual effect as a shading effect actually occurring in an actually existing target can be given to the virtual object. As a result, it is possible to display the virtual object in a very natural representation form regardless of a state of an illumination in the real space.

DESCRIPTION OF THE PREFERRED EMBODIMENTS

Hereinafter, preferred embodiments of an augmented reality provision method according to the present invention in a relationship with an augmented reality provision system that performs this method and an augmented reality provision program will be listed and described in detail with reference to the accompanying drawings.

Entire Configuration of Augmented Reality Provision System 10

Figure 1:
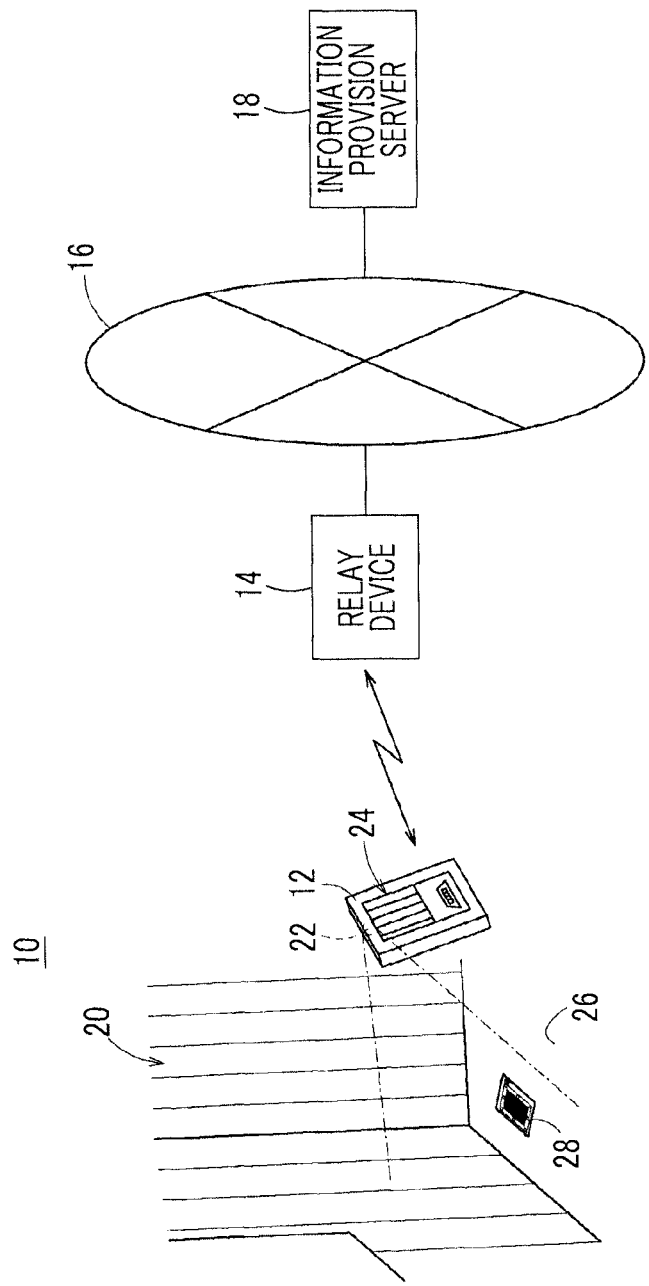
FIG. 1 is an entire schematic diagram of an augmented reality provision system according to an embodiment.

FIG. 1 is an entire configuration diagram of an augmented reality provision system 10 according to this embodiment. This system provides a virtual catalog service for furniture by performing AR (Augmented Reality) display in which a virtual object (for example, the furniture) is superimposed on an image of a real space 20.

The augmented reality provision system 10 includes a portable terminal device 12 carried by a user (not illustrated), a relay device 14, and an information provision server 18 that is accessed via a network 16, such as the Internet.

The portable terminal device 12 is a device which can communicate with an external device in a wired manner or wirelessly, and includes, for example, a portable telephone including a smartphone, a tablet terminal, or the like. The portable terminal device 12 includes an imaging unit 22 that images the real space 20, and a display unit 24 that displays an image (hereinafter, a captured image) obtained through imaging in the imaging unit 22. In this drawing example, a target 28 expressing the AR display is arranged on a floor 26 within (inside) the real space 20. An object formed of an arbitrary material in an arbitrary shape can be adopted as the target 28, but it is noted that the object has a specific pattern as described below.

The relay device 14 is a device that relays communication between the portable terminal device 12 and the information provision server 18. When the portable terminal device 12 is a portable telephone, the relay device 14 corresponds to a base station. When the portable terminal device 12 is a tablet terminal, the relay device 14 corresponds to an access point of a wireless LAN (Local Area Network).

The information provision server 18 provides data necessary for AR display (for example, an object image signal 48; see FIGS. 2 and 3) to the portable terminal device 12 in response to a request from the portable terminal device 12.

Electrical Block Diagram of Portable Terminal Device 12

Figure 2:
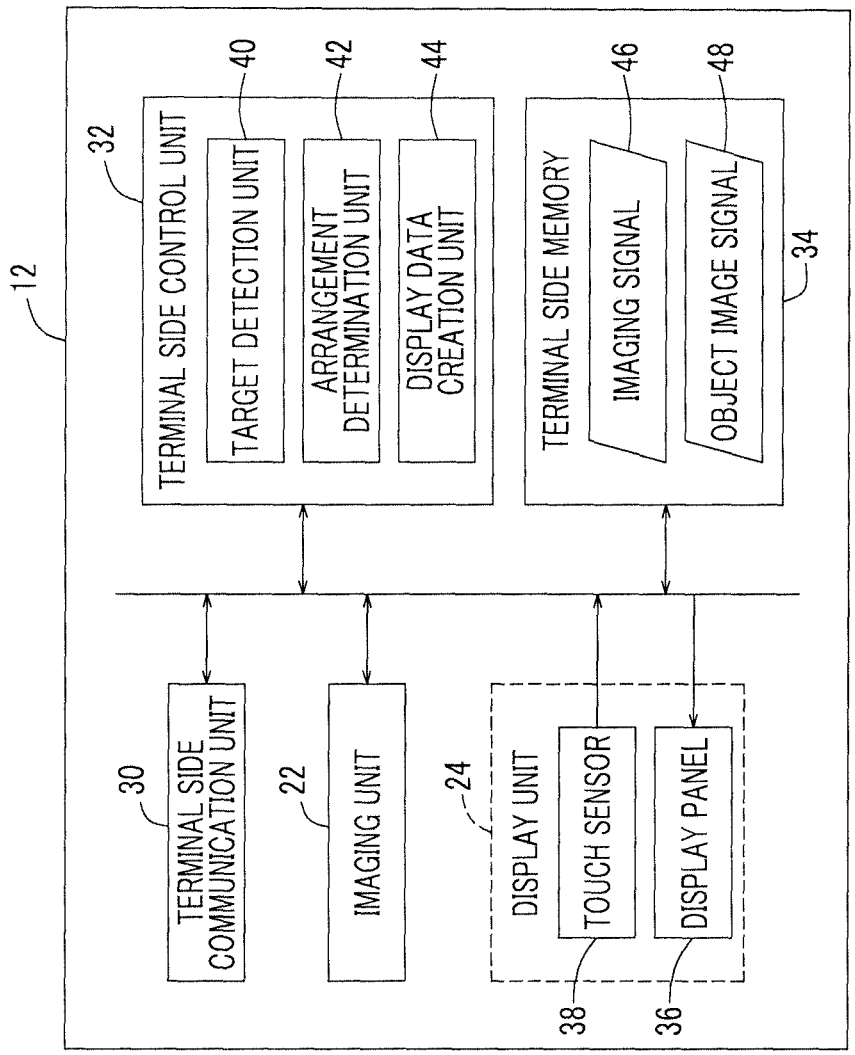
FIG. 2 is an electrical block diagram of a portable terminal device illustrated in FIG. 1.

FIG. 2 is an electrical block diagram of the portable terminal device 12 illustrated in FIG. 1. The portable terminal device 12 includes a terminal side communication unit 30, a terminal side control unit 32, and a terminal side memory (storage medium) 34, in addition to the imaging unit 22 and the display unit 24.

The imaging unit 22 includes, for example, a camera, and captures a monochrome image including one color channel or a color image including a plurality of color channels. The imaging unit 22 may be a monocular camera or may be a compound-eye camera (a so-called stereo camera).

The display unit 24 includes a display panel 36 that displays the color image or the monochrome image, and a touch sensor 38 that detects a touch position on the display panel 36. The display panel 36 includes, for example, a liquid crystal panel, an organic EL (Electro-Luminescence) panel, or an inorganic EL panel. Various schemes including a resistance film scheme, a capacitance scheme, an infrared scheme, an electromagnetic induction scheme, a capacitive coupling scheme, and the like may be used as a detection scheme for the touch sensor 38.

The terminal side communication unit 30 includes, for example, an RF (Radio Frequency) module which can input and output radio waves in a high frequency band, and has a function of transmitting and receiving an electrical signal from an external device.

The terminal side control unit 32 includes, for example, a microprocessor (MPU), and executes a control operation of each component by reading and executing a program stored in the terminal side memory 34 or the like. The terminal side control unit 32 realizes respective functions of a target detection unit 40, an arrangement determination unit 42, and a display data creation unit 44.

The terminal side memory 34 includes, for example, a storage medium such as a RAM (Random Access Memory), and stores a program, data or the like necessary for the terminal side control unit 32 to control each component. In this drawing example, an imaging signal 46 indicating a captured image 80 (see FIG. 5) and an object image signal 48 indicating an object image 108 (see FIG. 9) are stored in the terminal side memory 34.

This storage medium may be non-transient and computer readable. Here, the computer-readable storage medium is a storage device, such as a portable medium such as a magneto-optical disk, a ROM, a CD-ROM, or a flash memory, or a hard disk built into a computing system. Further, this storage medium may hold a program dynamically for a short time or may hold a program for a certain time.

Electrical Block Diagram of Information Provision Server 18

Figure 3:
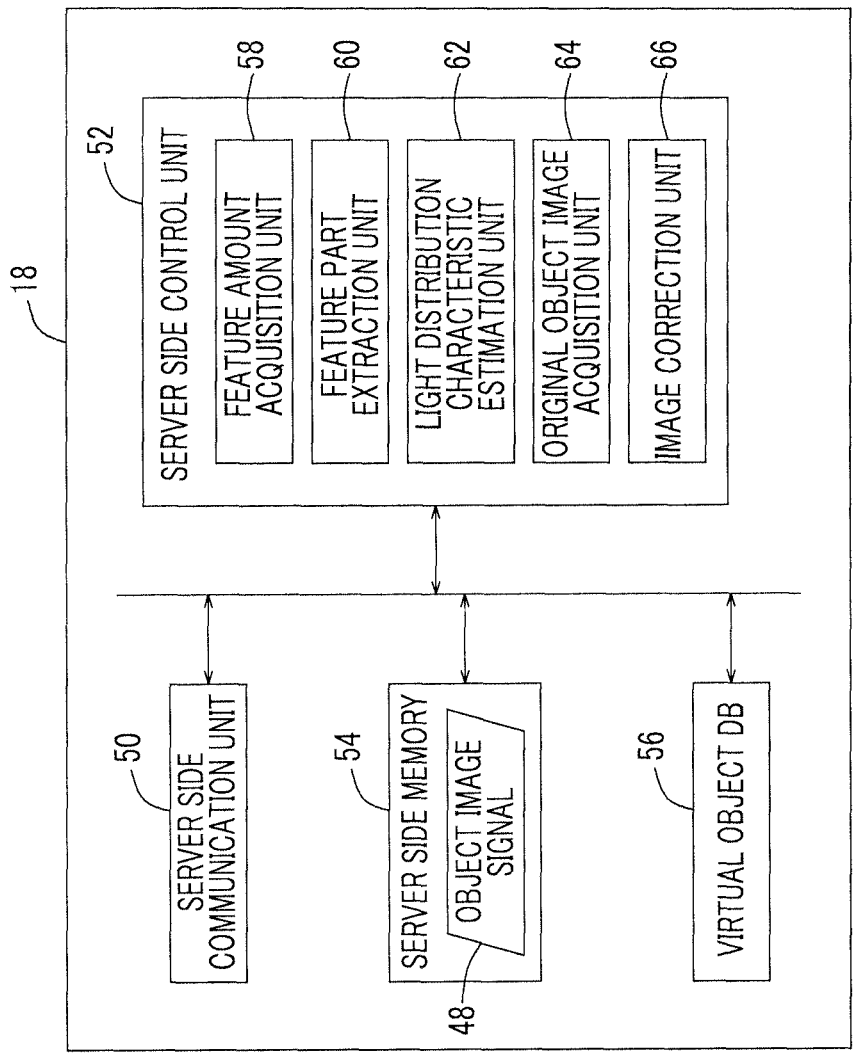
FIG. 3 is an electrical block diagram of an information provision server illustrated in FIG. 1.

FIG. 3 is an electrical block diagram of the information provision server 18 illustrated in FIG. 1. The information provision server 18 includes a server side communication unit 50, a server side control unit 52, a server side memory 54, and a virtual object database (hereinafter, a virtual object DB 56).

The server side communication unit 50 is an interface that performs wired or wireless transmission and reception to and from an external device (for example, the portable terminal device 12 of FIG. 1).

The server side control unit 52 realizes respective functions of a feature amount acquisition unit 58, a feature part extraction unit 60, a light distribution characteristics estimation unit 62, an original object image acquisition unit 64, and an image correction unit 66 by reading and executing a program stored in the server side memory 54.

The server side memory 54 is configured similarly to the terminal side memory 34 (FIG. 2), and stores a program, data or the like necessary for the server side control unit 52 to control each component. In this drawing example, the object image signal 48 indicating the object image 108 (see FIG. 9) is stored in the server side memory 54.

The virtual object DB 56 is a database that accumulates a template of an object image (hereinafter referred to as an "original object image") indicating a virtual object to be associated with a type of an expression mark 92 (FIG. 6) to be described below. Here, the original object image is assumed to be an image represented in a three-dimensional model.

Operation of Augmented Reality Provision System 10

The augmented reality provision system 10 according to this embodiment is configured as described above. Subsequently, an operation of the augmented reality provision system 10 of FIG. 1 will be described while mainly referring to a flowchart of FIG. 4. Further, the portable terminal device 12 of FIG. 2 and the information provision server 18 of FIG. 3 can be caused to cooperate with each other by executing installed application software.

In step S1, the real space 20 including the target 28 is imaged using the portable terminal device 12. First, the user specifies a position in which furniture is desired to be arranged in the real space 20, and arranges the target 28 in that position (on the floor 26). Also, the user performs a predetermined imaging operation in a state in which the user grips the portable terminal device 12 so that the target 28 is within an imaging range. Then, an output signal from the imaging unit 22 is temporarily stored as the imaging signal 46 in the terminal side memory 34.

Figure 5:
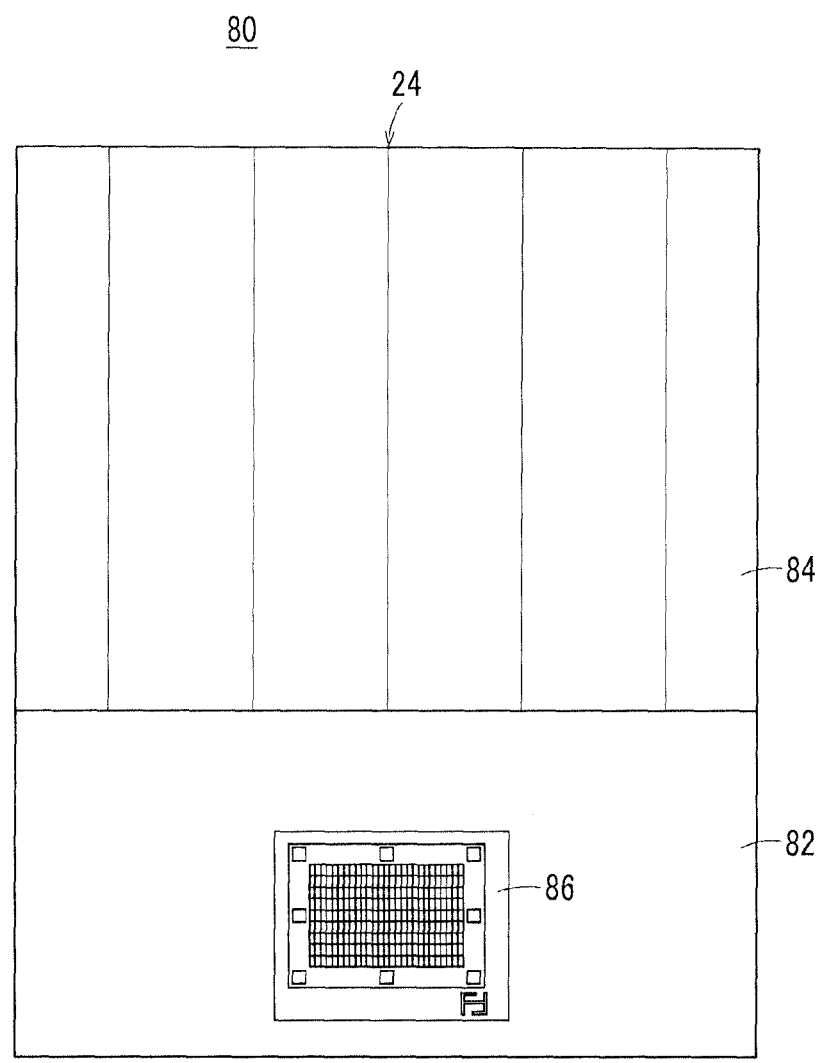
FIG. 5 is a schematic front view of a display unit that displays a captured image obtained through imaging.

FIG. 5 is a schematic front view of the display unit 24 that displays the captured image 80 obtained through imaging. The captured image 80 mainly includes a rectangular floor area 82 that occupies a lower half portion, and a rectangular wall area 84 that occupies an upper half portion. Further, there is a target area 86 indicating a projection image of the target 28 in a central lower portion of the floor area 82.

In step S2, the target detection unit 40 of the portable terminal device 12 detects the target 28 (that is, target area 86) from the captured image 80 obtained in step S1.

Figure 6:
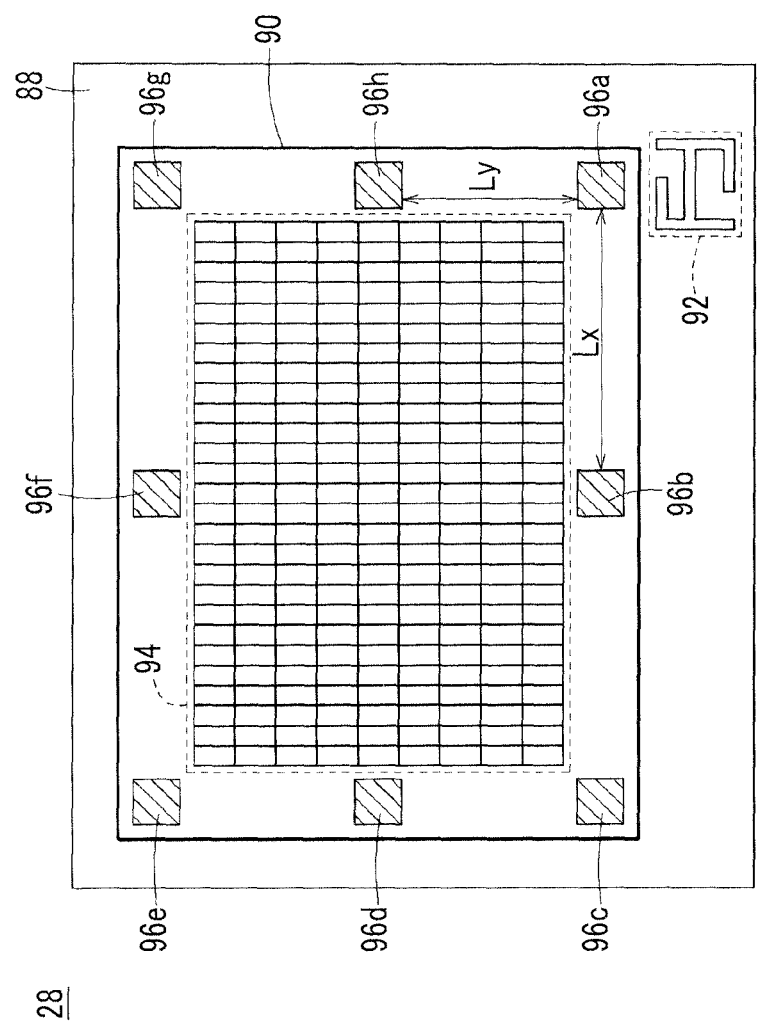
FIG. 6 is a plan view of a target illustrated in FIG. 1.

FIG. 6 is a plan view of the target 28 illustrated in FIG. 1, and corresponds to drawing content of the target area 86 in FIG. 5. The target 28 is a print in which an image is formed on a print medium 88. Specifically, a color chart 90 having a plurality of color patches, and an expression mark 92 of the AR display are drawn on the print medium 88.

The target detection unit 40 determines whether there is the expression mark 92 in the captured image 80 using a known image recognition scheme. For example, a template indicating the expression mark 92 may be prepared in advance, a degree of matching between the template and an arbitrary partial area in the captured image 80 may be obtained, and it may be determined that there is the expression mark 92 when the degree of matching is greater than a threshold. Further, preprocessing including an affine transformation may be performed on the captured image 80 so as to improve precision of the determination.

When it is determined that there is the expression mark 92, the portable terminal device 12 transmits the imaging signal 46 read from the terminal side memory 34 to the information provision server 18 via the terminal side communication unit 30. Then, the information provision server 18 receives the imaging signal 46 via the relay device 14 and the network 16. When a type (for example, a model number or an identification number of a product) of the virtual object is input and designated through another operation, the portable terminal device 12 may also transmit this information.

In step S3, the feature amount acquisition unit 58 of the information provision server 18 acquires a feature amount regarding a plurality of feature parts (here, the same color patches 96a to 96h) included in the captured image 80. Specifically, the feature amount acquisition unit 58 acquires a data set (including the feature amount) regarding a drawing form of the color chart 90 linked to a type of expression mark 92. Various values for specifying shapes and positions of the same color patches 96a to 96h can be used as this feature amount.

The color chart 90 includes a patch group 94 which is a set of color patches arranged in a lattice form, and eight same color patches 96a to 96h arranged in the vicinity of the patch group 94, as illustrated in FIG. 6. The patch group 94 is designed to have different colors and the same color patches 96a to 96h are designed to have the same color (for example, achromatic color).

The same color patches 96a, 96b and 96c, and the same color patches 96e, 96f and 96g are arranged at equal intervals (Lx). The same color patches 96c, 96d and 96e and the same color patches 96g, 96h and 96a are arranged at equal intervals (Ly).

In this case, the patch intervals Lx and Ly can be adopted as the feature amount for specifying the position. Alternatively, an arbitrary coordinate system may be defined on a plane formed by the color chart 90 and the feature amount may be positions of the respective same color patches 96a to 96h in this coordinate system. A feature amount that specifies the color may be a color value represented by an arbitrary color system (for example, a CMYK value or an L*a*b* value) or may be information related to the color value (for example, identification information of a color sample).

In step S4, the feature part extraction unit 60 of the information provision server 18 extracts a plurality of feature parts from the captured image 80 based on the feature amount acquired in step S3. In the example of the captured image 80 illustrated in FIG. 5, respective image parts corresponding to the eight same color patches 96a to 96h are extracted.

Further, the feature part extraction unit 60 may extract individual halftone tint areas such as the same color patches 96a to 96h as feature parts, or may extract a plurality of partial areas in one halftone tint area (a large color patch).

In step S5, the light distribution characteristics estimation unit 62 of the information provision server 18 estimates light distribution characteristics of the light 102 with which the target 28 is irradiated, from the relationship between the color values in the eight same color patches 96a to 96h extracted in step S4. Prior to an estimation process, the light distribution characteristics estimation unit 62 calculates respective representative pixel values (for example, average value) in the respective same color patches 96a to 96h and converts the pixel values into luminance values associated with brightness of the color.

Figure 7:
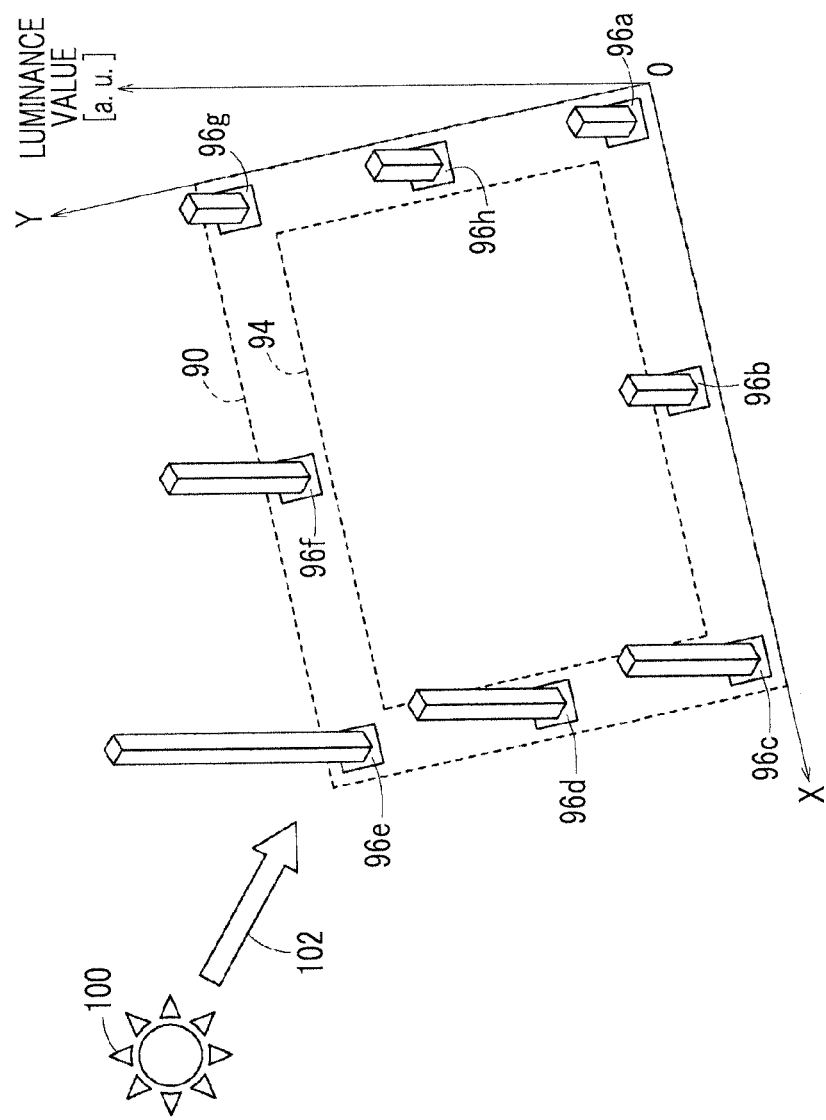
FIG. 7 is a schematic view illustrating a two-dimensional distribution of light with which a color chart of FIG. 6 is irradiated.

FIG. 7 is a schematic view illustrating a two-dimensional distribution of the light 102 with which the color chart 90 of FIG. 6 is irradiated. Here, a vertex closest to the expression mark 92 (FIG. 6) among four vertexes included in the rectangular color chart 90 is an origin O. Further, a longitudinal direction of the color chart 90 is an X axis, a lateral direction of the color chart 90 is a Y axis, and a luminance value (a unit thereof is arbitrary) is a Z axis.

For example, a case in which a single light source 100 performs irradiation with (or radiation of) the light 102 according to predetermined light distribution characteristics is assumed. When a diffusion phenomenon of the light is considered, an amount of light arrival tends to increase as a distance from the light source 100 becomes shorter, and the arrival amount of light tends to decrease as this distance becomes longer. As a result, even when feature parts have the same colors, an observer may recognize different colors (particularly, brightness) according to a positional relationship between the feature parts.

A histogram of FIG. 7 indicates a two-dimensional distribution when a light source 100 is on the left rear side of the target 28 based on a position and an imaging direction of the portable terminal device 12. As understood from this histogram, a luminance value of the same color patch 96e in the left rear side is greatest, and a luminance value of the same color patch 96a on the right front side is smallest.

The light distribution characteristics estimation unit 62 estimates light distribution characteristics of the light 102 with which the target 28 is irradiated, using an absolute value (or a relative value) of the luminance value obtained here. Here, "light distribution characteristics" mean characteristics regarding intensity and/or direction of the light 102. For example, the light distribution characteristics may be direct characteristics including a position and a posture of the light source 100 or may be indirect characteristics including a two-dimensional distribution of the light 102 arriving at the target 28.

In step S6, the original object image acquisition unit 64 of the information provision server 18 acquires the original object image indicating the virtual object (for example, a chair) according to a type of expression mark 92 by searching for and referring to the virtual object DB 56. Here, the original object image is an image of the chair represented by a three-dimensional model.

In step S7, the image correction unit 66 of the information provision server 18 corrects the color of the original object image acquired in step S6. This correction is realized by giving a visual effect in which the virtual object is irradiated with the light 102, depending on the light distribution characteristics estimated in step S5. Specifically, the image correction unit 66 obtains the object image 108 (FIG. 9) different from the original object image by performing a known shading process (a shading process in a narrow sense) and/or a shadowing process.

Further, the image correction unit 66 may correct the color of the original object image using the color patches (patch group 94) other than the same color patches 96a to 96h among two or more color patches. This is because color reproduction characteristics can be guaranteed in a wide color range of the display unit 24 by considering a color measurement result in a plurality of colors, as well as one color.

Further, the image correction unit 66 may further correct the size of the original object image to maintain a relative size relationship with the target area 86 in the captured image 80. Accordingly, reality of the virtual object further increases in terms of size.

A signal indicating this object image 108 is temporarily stored as the object image signal 48 in the server side memory 54. The information provision server 18 transmits the object image signal 48 read from the server side memory 54 to the portable terminal device 12 via the server side communication unit 50. Then, the portable terminal device 12 receives the object image signal 48 via the network 16 and the relay device 14.

In step S8, the portable terminal device 12 superimposes the object image 108 subjected to the color correction in step S7 on the captured image 80 and displays the object image 108. Prior to the display, the arrangement determination unit 42 determines a position of the vicinity of the target 28 (including the position of the target 28) in the captured image 80 as an arrangement position 104 of the object image 108.

Figure 8:
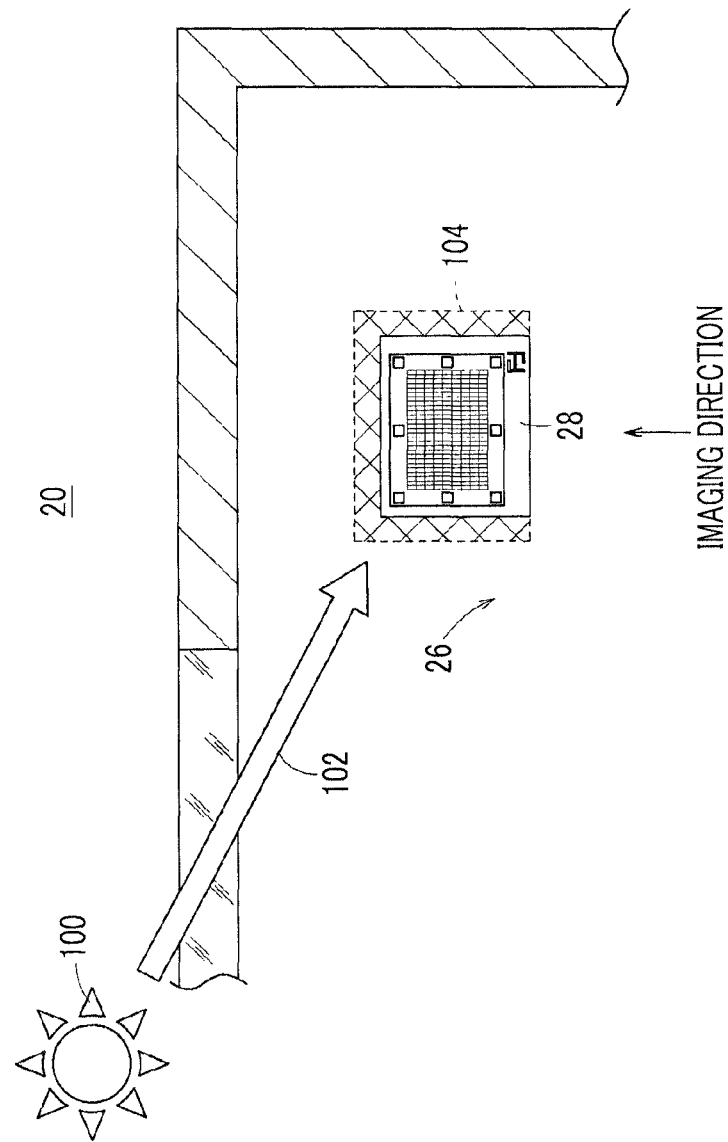
FIG. 8 is an overhead view of the real space illustrated in FIG. 1.

FIG. 8 is an overhead view of the real space 20 illustrated in FIG. 1. The target 28 is arranged on the floor 26. In this drawing example, the arrangement position 104 overlaps the position of the target 28. Here, a relative positional relationship between the target 28 and the object image 108 can be arbitrarily set and, for example, can be adjusted through an operation using the portable terminal device 12.

The display data creation unit 44 creates display data of an image (hereinafter, combination image 106) obtained by combining the imaging signal 46 and the object image signal 48, and outputs the display data to the display unit 24. Accordingly, the combination image 106 is displayed on the display unit 24.

Figure 9:
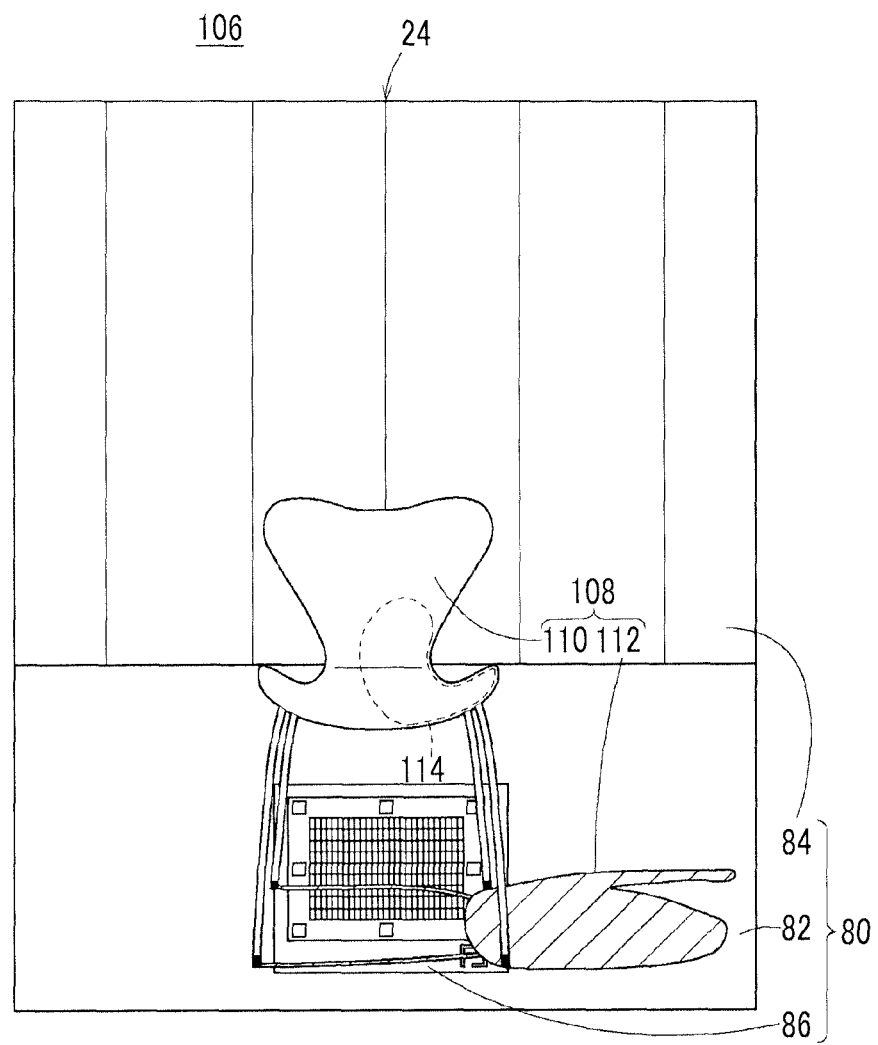
FIG. 9 is a schematic front view of a display unit that displays a combination image.

FIG. 9 is a schematic front view of the display unit 24 that displays the combination image 106. The object image 108 indicating a front view of the chair is superimposed in a position across the floor area 82, the wall area 84, and the target area 86 and displayed. The object image 108 is an image in which a body portion 110 indicating the chair itself and a shadow portion 112 indicating a shadow of the chair are combined. Further, a dark area 114 of the body portion 110 is configured with a darker color than that of the other parts.

Thus, the operation of the augmented reality provision system 10 is completed. Even when there is no real chair, the user can recognize a color tone and a size at a glance by viewing the AR display. Further, since the shading effect is given to the object image 108, the user does not feel uncomfortable therewith.

Effects of this Embodiment

As described above, the augmented reality provision system 10 includes the imaging unit 22 that images the real space 20, and the display unit 24 that superimposes the object image 108 indicating the virtual object on the captured image 80 obtained through imaging and displays the object image 108.

Also, this system includes the feature part extraction unit 60 that extracts a plurality of same color patches 96a to 96h from the captured image 80 including the target 28 having the plurality of same color patches 96a to 96h with the same color, the light distribution characteristics estimation unit 62 that estimates light distribution characteristics of the light 102 with which the target 28 is irradiated, from the relationship between the color values in the plurality of same color patches 96a to 96h, and the image correction unit 66 that obtains the object image 108 to which the visual effect in which the virtual object is irradiated with the light 102 depending on the light distribution characteristics has been given, by correcting the color of the original object image indicating the virtual object.

With such a configuration, the same visual effect as a shading effect actually occurring in an actually existing target 28 can be given to the virtual object. As a result, it is possible to display the virtual object in a very natural representation form regardless of a state of an illumination in the real space 20.

Modification Examples

Next, modification examples of the augmented reality provision system 10 according to this embodiment will be described with reference to FIGS. 10 and 11. Further, the same components as those in this embodiment are denoted with the same reference signs, and description thereof will be omitted.

First Modification Example

Figure 10:
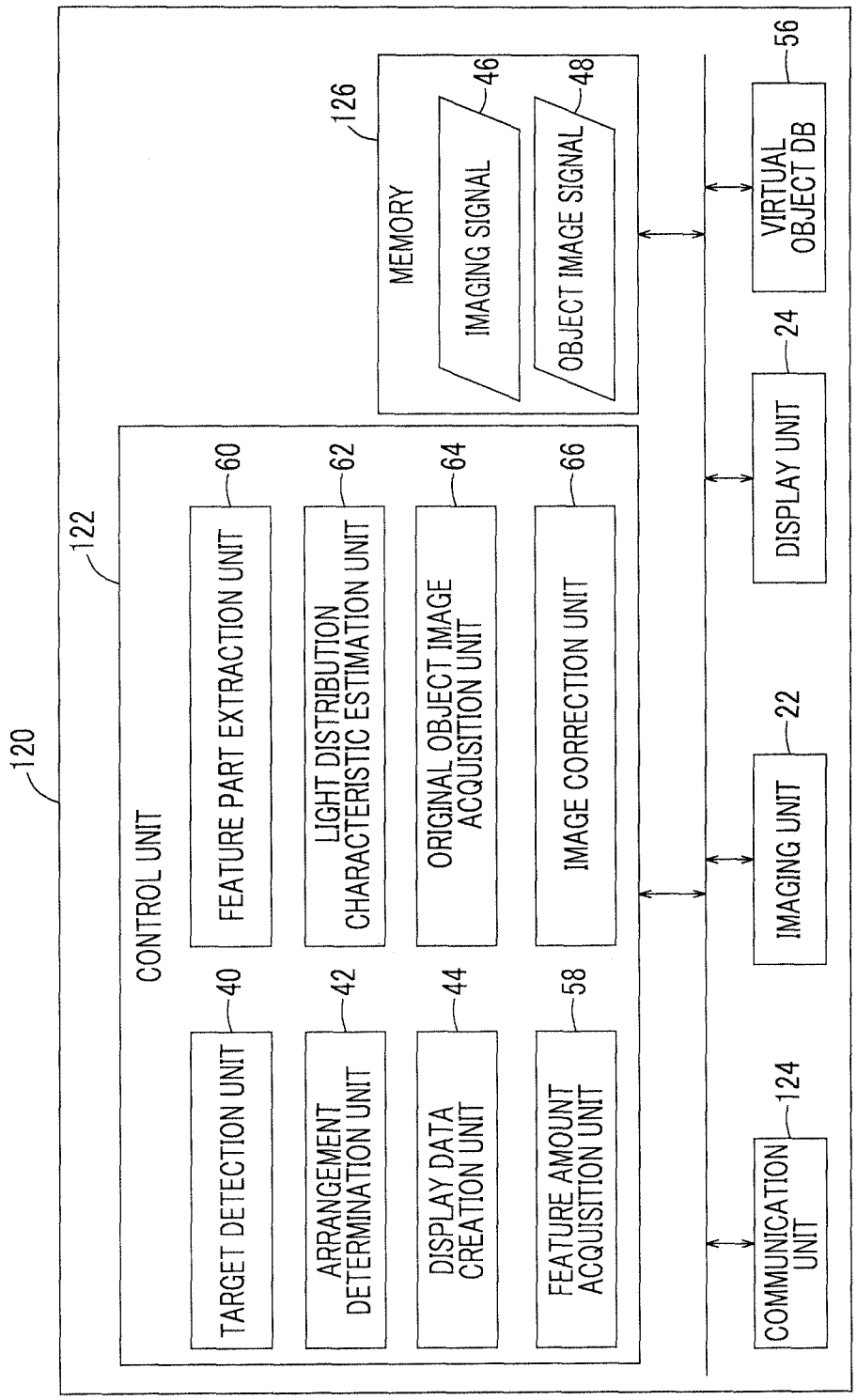
FIG. 10 is an electrical block diagram of an augmented reality provision system according to a first modification example.

FIG. 10 is an electrical block diagram of an augmented reality provision system 120 according to a first modification example. This augmented reality provision system 120 is different from this embodiment (the augmented reality provision system 10 of FIG. 1) in that the augmented reality provision system 120 is configured as a single device.

The augmented reality provision system 120 includes a control unit 122, a communication unit 124, an imaging unit 22, a display unit 24, a virtual object DB 56, and a memory 126 (storage medium).

The control unit 122 realizes respective functions of a target detection unit 40, an arrangement determination unit 42, a display data creation unit 44, a feature amount acquisition unit 58, a feature part extraction unit 60, a light distribution characteristics estimation unit 62, an original object image acquisition unit 64, and an image correction unit 66 by reading and executing a program stored in the memory 126.

The communication unit 124 is an interface that performs wired or wireless transmission and reception to and from an external device. The memory 126 stores a program, data or the like necessary for the control unit 122 to control each component.

With this configuration, the same operation and effects as those in this embodiment are obtained. Since the augmented reality provision system 120 is configured as a single device, it is noted that a data communication process via the relay device 14 and the network 16 (FIG. 1) is not necessary.

Second Modification Example

Figure 11:
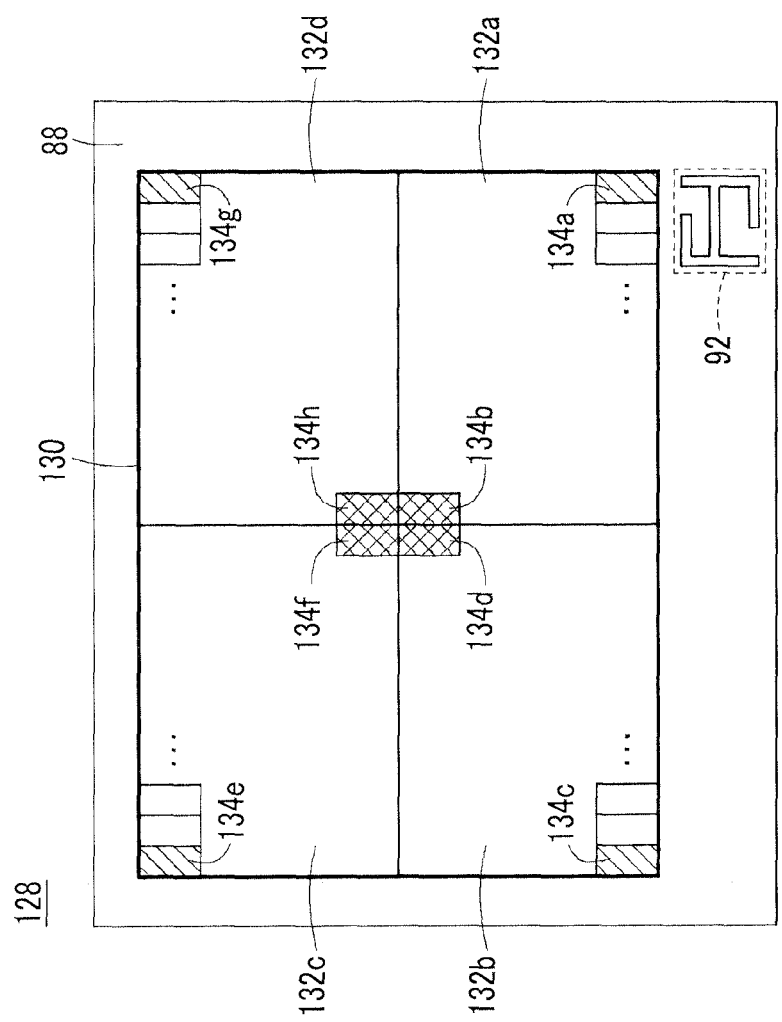
FIG. 11 is a plan view of a target according to a second modification example.

FIG. 11 is a plan view of a target 128 according to a second modification example. This target 128 has different drawing content from this embodiment (the target 28 of FIG. 6).

The target 128 is a print in which an image is formed on a print medium 88. Specifically, a color chart 130 having a plurality of color patches, and an expression mark 92 of AR display are drawn on the print medium 88.

The color chart 130 is configured by combining patch groups 132a, 132b, 132c and 132d in which color patches are two-dimensionally arranged. The patch groups 132a to 132d all have the same drawing content, but have different directions of arrangement thereof. Specifically, the patch group 132a and the patch group 132b are arranged in a horizontally symmetrical manner. Further, the patch group 132a and the patch group 132c are arranged in a horizontally and vertically symmetrical manner. Further, the patch group 132a and the patch group 132d are arranged in the vertically symmetrical manner.

That is, rectangular areas with single hatching are the same color patches 134a, 134c, 134e and 134g belonging to a first group, and correspond to a plurality of feature parts. Further, rectangular areas with double hatching are the same color patches 134b, 134d, 134f, and 134h belonging to a second group, and correspond to a plurality of feature parts.

For example, it is possible to estimate the light distribution characteristics using the same color patches 134a, 134c, 134e and 134g belonging to the first group. Further, it is possible to estimate the light distribution characteristics in which a difference in shade is also reflected, by preparing a plurality of sets of feature parts (the first group, the second group, . . . ).

Supplement

Further, it is understood that the present invention is not limited to the above-described embodiment, and can be freely changed without departing from the main gist of the present invention.

While the expression mark 92 separate from the color chart 90 is provided in the target 28 in this embodiment, the present invention is not limited to this embodiment, and a representation function of AR display may be given to the color chart 90. In this case, the target detection unit 40 detects presence or absence of the target 28 and a type thereof from a combination of, for example, the color, the shape, the position, and the posture of the patch group 94 and/or the same color patches 96a to 96h.

Figure 4:
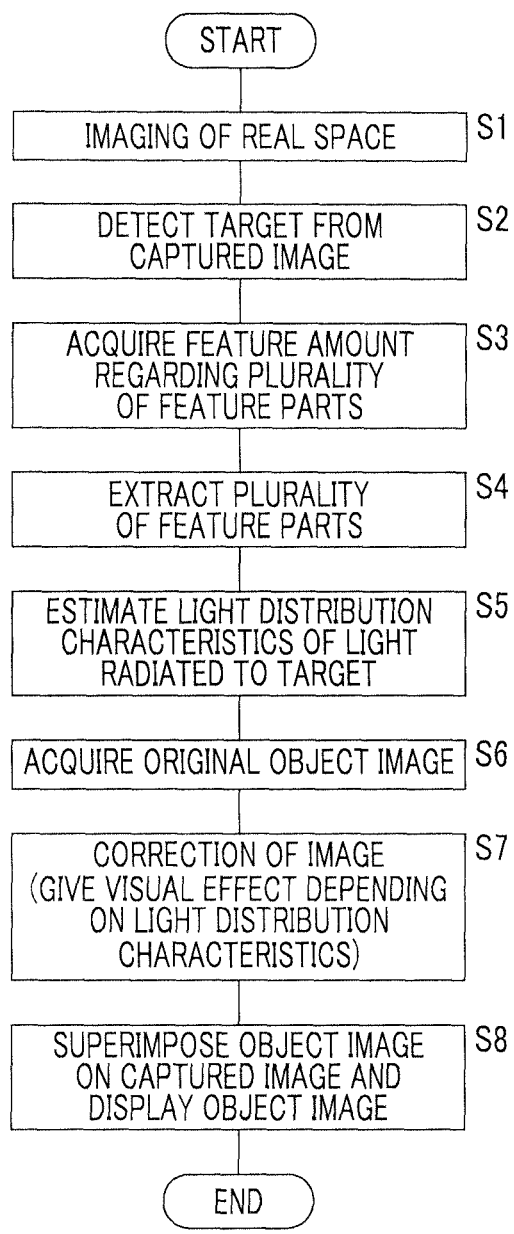
FIG. 4 is a flowchart provided for description of an operation of the augmented reality provision system illustrated in FIG. 1.

While the description has been given on the assumption that the captured image 80 is a still image in this embodiment, it is understood that the prevent invention is also applicable to a moving image, for example, by sequentially executing the flowchart of FIG. 4.

What is claimed is:

1. An augmented reality provision system including a camera that images a real space, a display that superimposes an object image indicating a virtual object on a captured image obtained through the imaging in the camera and displays the object image, and a processor,
    the processor configured to perform:
    extracting a plurality of feature parts from the captured image including a target, the target including the plurality of feature parts having a same color;
    estimating light distribution characteristics of light with which the target is irradiated, from a relationship between color values in the plurality of feature parts, and obtaining the object image to which a visual effect in which the virtual object is irradiated with the light has been given depending on the light distribution characteristics, by shading and correcting a color of an original object image indicating the virtual object,
    wherein the light distribution characteristics of light is intensity and direction of light, wherein the target is a color chart including a plurality of color patches, the plurality of feature parts is a plurality of same color patches included in the plurality of color patches, and the processor extracts the plurality of same color patches from the captured image including the target.

2. The augmented reality provision system according to claim 1, the processor further configured to perform:
    acquiring a feature amount that specifies a position and/or a shape of the plurality of feature parts,
    extracting the plurality of feature parts using the feature amount.

3. The augmented reality provision system according to claim 2, the processor further configured to perform:
    determining a position in a vicinity of the target, including a position of the target in the captured image, as an arrangement position of the object image.

4. The augmented reality provision system according to claim 3, the processor further configured to perform:
    correcting the color of the original object image using color patches other than the plurality of same color patches among the plurality of color patches.

5. The augmented reality provision system according to claim 2, the processor further configured to perform:
    correcting the color of the original object image using color patches other than the plurality of same color patches among the plurality of color patches.

6. The augmented reality provision system according to claim 1, the processor further configured to perform:
    determining a position in a vicinity of the target, including a position of the target in the captured image, as an arrangement position of the object image.

7. The augmented reality provision system according to claim 6, the processor further configured to perform:
    correcting the color of the original object image using color patches other than the plurality of same color patches among the plurality of color patches.

8. The augmented reality provision system according to claim 1, the processor further configured to perform:
    correcting the color of the original object image using color patches other than the plurality of same color patches among the plurality of color patches.

9. The augmented reality provision system according to claim 1, the processor further configured to perform:
    estimating light distribution characteristics from a relationship between color values in a plurality of sets of feature parts.

10. The augmented reality provision system according to claim 1, the processor further configured to perform:
    detecting presence or absence of the target and a type thereof from a combination of the color, the shape, the position and the posture of the patches and/or the same color patches.

11. An augmented reality provision method using the system according to claim 1, the system including a camera that images real space, and a display that superimposes an object image indicating a virtual object on a captured image obtained through the imaging in the camera and displays the object image, the method comprising:
    an extraction step of extracting a plurality of feature parts from the captured image including a target, the target including the plurality of feature parts having a same color;
    an estimation step of estimating light distribution characteristics of light with which the target is irradiated, from a relationship between color values in the plurality of extracted feature parts; and
    a correction step of obtaining the object image to which a visual effect in which the virtual object is irradiated with the light has been given depending on the estimated light distribution characteristics, by shading and correcting a color of an original object image indicating the virtual object,
    wherein the light distribution characteristics of light is intensity and direction of light,
    wherein the target is a color chart including a plurality of color patches,
    the plurality of feature parts is a plurality of same color patches included in the plurality of color patches, and
    the extraction step of extracting a plurality of feature parts extracts the plurality of same color patches from the captured image including the target.

12. A non-transitory computer readable medium having an augmented reality provision program recorded thereon, the program causing the augmented reality provision system according to claim 1, the system including a camera that images a real space, and a display that superimposes an object image indicating a virtual object on a captured image obtained through the imaging in the camera and displays the object image, to execute:
    an extraction step of extracting a plurality of feature parts from the captured image including a target, the target including the plurality of feature parts having a same color;
    an estimation step of estimating light distribution characteristics of light with which the target is irradiated, from a relationship between color values in the plurality of extracted feature parts; and
    a correction step of obtaining the object image to which a visual effect in which the virtual object is irradiated with the light has been given depending on the estimated light distribution characteristics, by shading and correcting a color of an original object image indicating the virtual object, wherein the light distribution characteristics of light is intensity and direction of light,
wherein the target is a color chart including a plurality of color patches,
the plurality of feature parts is a plurality of same color patches included in the plurality of color patches, and
the extraction step of extracting a plurality of feature parts extracts the plurality of same color patches from the captured image including the target.

* * * * *